Aug. 1, 1961

H. M. FLEMING 2,994,474

TRUE NEGATIVE TOTAL MECHANISM

Filed Sept. 3, 1957

INVENTOR
HOWARD M. FLEMING
BY
Norman Friedman
ATTORNEY

Aug. 1, 1961    H. M. FLEMING    2,994,474
TRUE NEGATIVE TOTAL MECHANISM
Filed Sept. 3, 1957    7 Sheets-Sheet 3

FIG. 3

INVENTOR
HOWARD M. FLEMING
BY
Norman Friedman
ATTORNEY

Aug. 1, 1961  H. M. FLEMING  2,994,474
TRUE NEGATIVE TOTAL MECHANISM
Filed Sept. 3, 1957  7 Sheets-Sheet 4

INVENTOR.
HOWARD M. FLEMING
BY
Norman Friedman
ATTORNEY

Aug. 1, 1961 H. M. FLEMING 2,994,474
TRUE NEGATIVE TOTAL MECHANISM
Filed Sept. 3, 1957 7 Sheets-Sheet 5

INVENTOR
HOWARD M. FLEMING
BY
Norman Friedman
ATTORNEY

Aug. 1, 1961  H. M. FLEMING  2,994,474
TRUE NEGATIVE TOTAL MECHANISM
Filed Sept. 3, 1957  7 Sheets-Sheet 6

INVENTOR
HOWARD M. FLEMING
BY Norman Friedman
ATTORNEY

United States Patent Office 2,994,474
Patented Aug. 1, 1961

2,994,474
TRUE NEGATIVE TOTAL MECHANISM
Howard M. Fleming, West Orange, N.J., assignor to Monroe Calculating Machine Company, Orange, N.J., a corporation of Delaware
Filed Sept. 3, 1957, Ser. No. 681,669
12 Claims. (Cl. 235—60.2)

The present invention relates to calculating machines and more particularly to means for taking a true negative total from a calculating machine of the type in which negative totals are registered in complemental form.

Patent No. 1,915,296 issued June 27, 1933, to L. P. Crosman discloses a listing adding machine having a crawl carry register and means for taking a true negative total from said register. As set forth in said patent, the taking of a true negative total requires three cycles of machine operation: in the first cycle the register is zeroized, the zeroizing movement of the differential actuators serving to differentially set suitable storage or stop members to the complemental negative total; in the second cycle the actuators are operated subtractively to the extent permitted by the stop members, thereby subtracting the complement from the register and giving a registration of the true negative total; and in the third cycle the register is again zeroized to obtain the true negative total. If a sub-total is desired, a fourth cycle of operation is necessary in which the true negative total is subtracted from the register to restore the complemental negative total.

The present invention contemplates the provision in a calculating machine of differentially adjustable digital storage devices which are adjusted to a first position representative of a complemental negative total standing in the register of the machine. Thereafter, the storage devices are further adjusted from the first, complementally adjusted position to a second position differing therefrom by an amount corresponding to the complement of the complemental negative value or, in other words, corresponding to the true negative value. The true negative excursion of the storage devices between said first and second positions can be used to effect a like digital adjustment of any suitable printing, registering, display, or read-out device to the true negative value. The adjustment of the storage devices to the second position is controlled by stop means which operate to limit said adjustment to a given radix value in the lowest significant order of the total and to the radix minus 1 in the higher orders, such differential being necessary to provide for the fugitive one. In the conventional decimal system of notation, the radix is of course 10.

As set forth in detail hereinafter, applicant's preferred embodiment comprises an adding listing machine having a crawl carry register and incorporating digital storage devices as described above, which are operable to permit taking a true negative total or sub-total in two cycles of operation. In the first cycle, zeroizing is effected, the zeroizing excursion of the differential actuators serving to effect a first adjustment of the storage devices to the complemental negative total. In the second cycle, the storage devices are moved from their first position of adjustment into engagement with stops which limit the adjustment to a value of 10 in the lowest significant order of the total and 9 in the higher orders, whereby the magnitude of the second cycle movement corresponds to the complement of the complemental negative total, i.e., to the true negative total. Such movement of the storage devices is employed to control the excursion of the differential actuators from home position, said actuators in turn controlling the setting of type bars which are thereupon operated to print the true negative total.

It is therefore a primary object of the invention to provide a new and improved true negative total mechanism.

It is a further object to provide a true negative total mechanism including novel digital storage devices.

Another object is the provision of true negative total mechanism including novel digital storage devices adapted to be first adjusted to a complemental negative value and thereafter to be adjusted to a second value differing from said complemental negative value by the complement thereof.

A feature of the invention resides in the provision of digital storage devices provided with novel fugitive one mechanism.

For the purposes of the present disclosure, the invention is shown as applied to a listing-adding machine of a well-known type incorporating conventional features disclosed in various prior patents referred to previously and subsequently. To the extent that it is practical to do so, the parts hereinafter described which correspond to like parts of said patents will be similarly numbered, and reference is made to said patents for details of construction not fully described in this specification.

It should be understood, however, that the following disclosure is intended to be illustrative only and not limiting of the invention, since the invention can be applied in other specific embodiments and to other types of computing machines.

Registering mechanism

The machine is of the general type disclosed in Patent No. 2,055,623 issued to L. P. Crosman, September 29, 1936, (noting particularly FIG. 7 of said patent) and includes an accumulator register comprising an ordinally arranged series of numeral wheels 473 (FIG. 1) provided with crawl carry mechanism as disclosed in my Patent 2,450,787 issued October 5, 1948. Amounts set up on digit keys 215 are transferred, additively or subtractively, upon operation of motor control key 138 (FIG. 2) to numeral wheels 473 by means of a series of spring operated differential actuators 610 loosely mounted upon a transverse shaft 608. The forward arm of each differential actuator lever 610 is provided with segmental rack teeth adapted to mesh with the pinions 472 of the series of accumulator wheels 473. Index bars 615 pivotally connected with the upper arms of levers 610 by pins 610' are moved, upon counterclockwise rotation of the levers, into engagement with the stems of selectively depressed digit keys 215. Type bars 611 are pivotally connected to the rearward arms of levers 610, each type bar being provided with a vertically arranged series of type faces representing the digits 0 to 9.

The digit keys 215 which have been depressed to represent a value are latched in position with the bottoms of their stems lying in the path of movement of the related lateral stop lugs of the bars 615, allowing such bars to advance a distance proportional to the value of the key upon operation of the machine. Depression of a digit key will also remove a column latch 214 from the forward path of movement of its related stop bar 615, these latches preventing movement of a stop bar and actuator lever 610 in any column in which no key has been depressed.

Each of the actuator racks 610 is held in normal clockwise position against the tension of its operating spring 683, by studs 659 fast in said racks and engaged with one of an ordinal series of dogs 617 pivotally mounted upon a transverse rod 618 supported within a rocker frame 616 loosely mounted for rotation on the shaft 608.

The rotary movement of frame 616 is controlled by a cam 318 fastened to a main rock shaft 301. Shaft 301 is oscillated by means of an electric motor 100 connected through suitable reduction gearing and clutch means 153, 157 (FIG. 2) with a rock arm 316, fast with shaft 301, by means of a connecting rod 161, so that as a crank plate 155 is rotated by the motor, shaft 301 will be oscillated. As shaft 301 is rotated forwardly, cam 318 will permit frame 616 to rock counterclockwise under the urge of spring 616', and any of the racks 610 which have been released by the depression of digit keys 215 will be allowed to rotate under the influence of their springs 683 until they are stopped by the lugs of index bar 615 contacting with the stems of the depressed keys. Upon rearward return movement of shaft 301, cam 318 will restore the frame 616 and the dogs 617 will return the operated racks 610 to normal position. The excursion of the racks 610 serves to register amounts set in the keyboard upon the register 473 and to set up a like amount on the printing line of the type bars 611.

Motor operation of the machine is initiated by depression of pivotally mounted key 138, a depending arm 138a of which is adapted to engage pin 139a of a slide 139 and move said slide rearwardly to abut the upper arm of a latch 147, thereby releasing said latch from clutch control lever 150. Said lever 150 will thereupon be moved counterclockwise by its spring 151. In this movement, an insulated roller 63 on the lever will act to close a switch 65 in the circuit of electric motor 100, and the lower end of the lever will be disengaged from a lug 152 at the tail of the spring urged clutch pawl 153. The clutch pawl will thus be permitted to drop into engagement with the driving clutch member 157 to effect a machine cycle of operation.

During a cycle of operation the accumulator wheels 473 are rotated subtractively upon the forward stroke or additively upon the return stroke of the actuators 610, there being an actuator lever 610 and an associated accumulator wheel 473 for each order of the machine.

Figure 12:
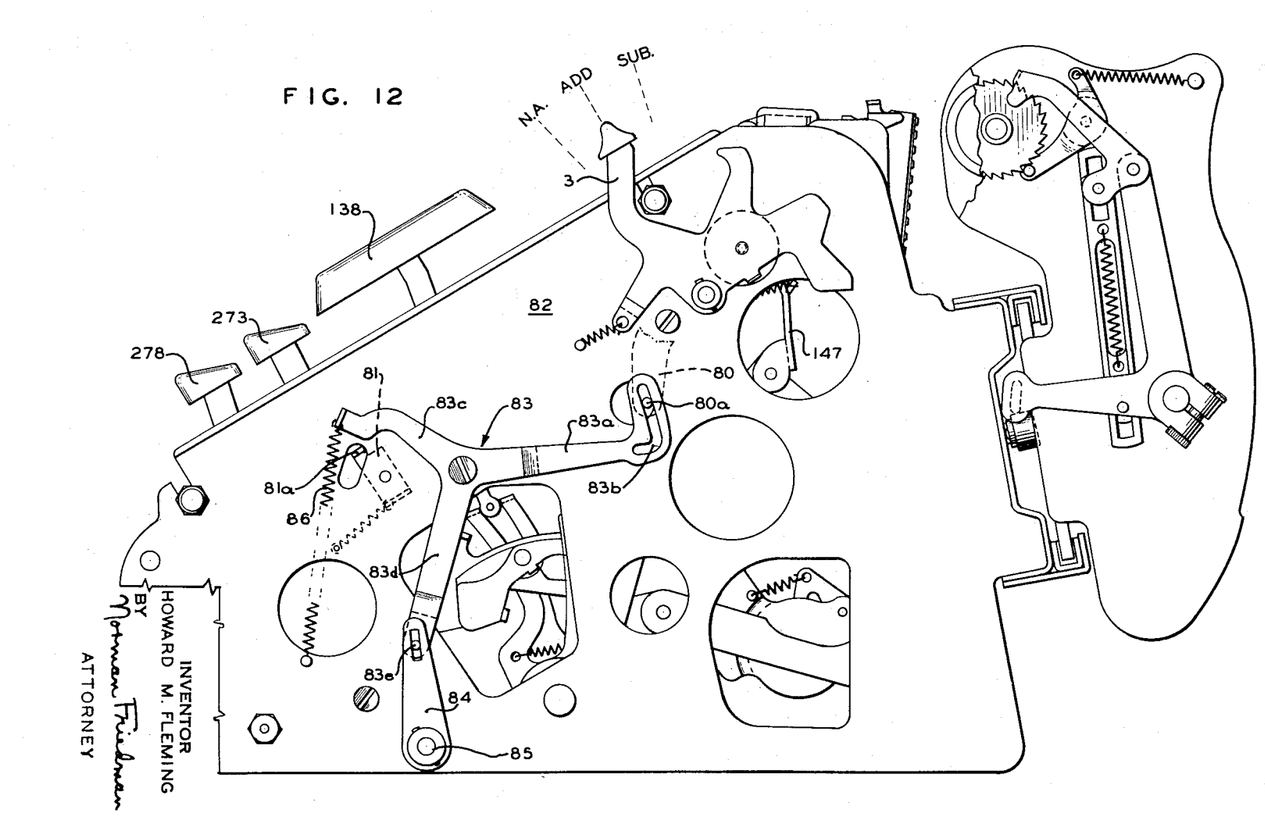
FIG. 12 is a right side elevation showing the true negative total control mechanism for preventing unlatching of the total key in the first cycle and for adjusting the switch cam to non-add position for the second cycle.

The timed meshing and unmeshing of the accumulator gears 472 with the actuators 610 for add, subtract, or non-add operations, depending upon the positions of a manually settable control lever 3 (FIG. 12), is controlled as follows and as more fully described in Patent No. 2,055,623.

Figure 1:
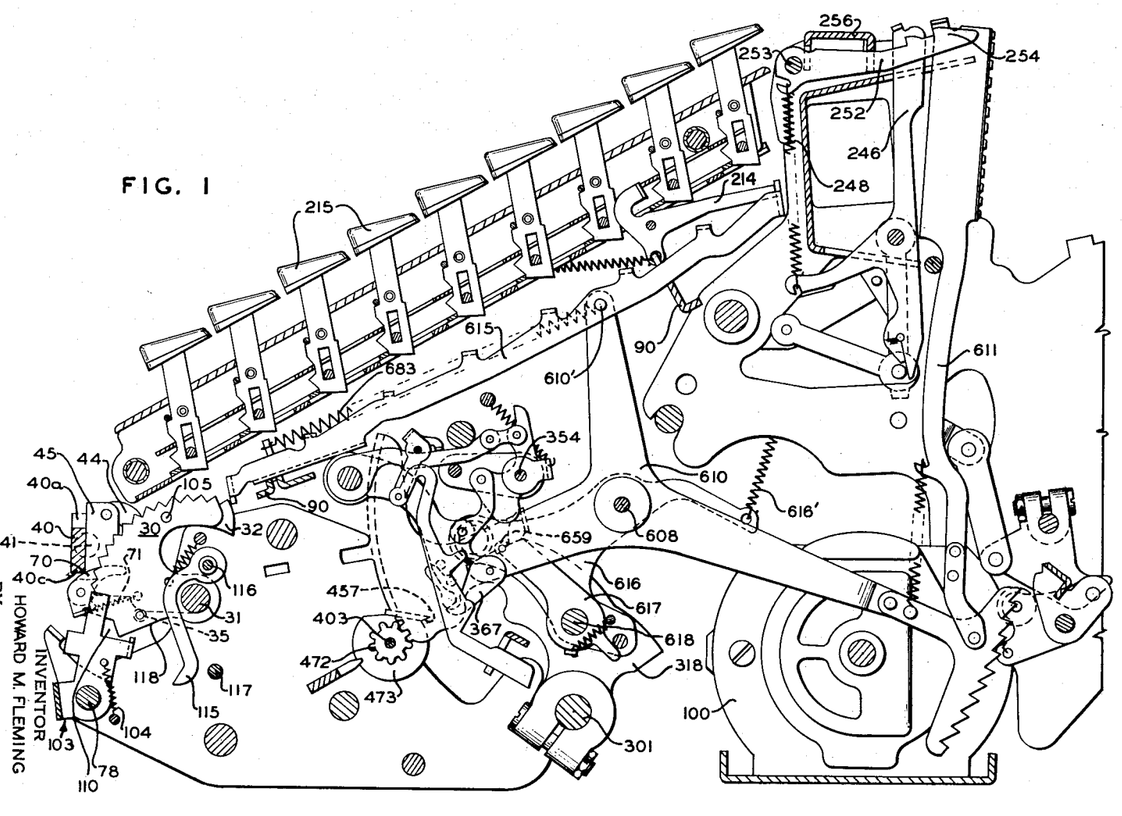
FIG. 1 is a right side elevation in section of an adding listing machine constructed in accordance with the invention showing the registering mechanism and the digital storage devices.
Figures 2, 2A:
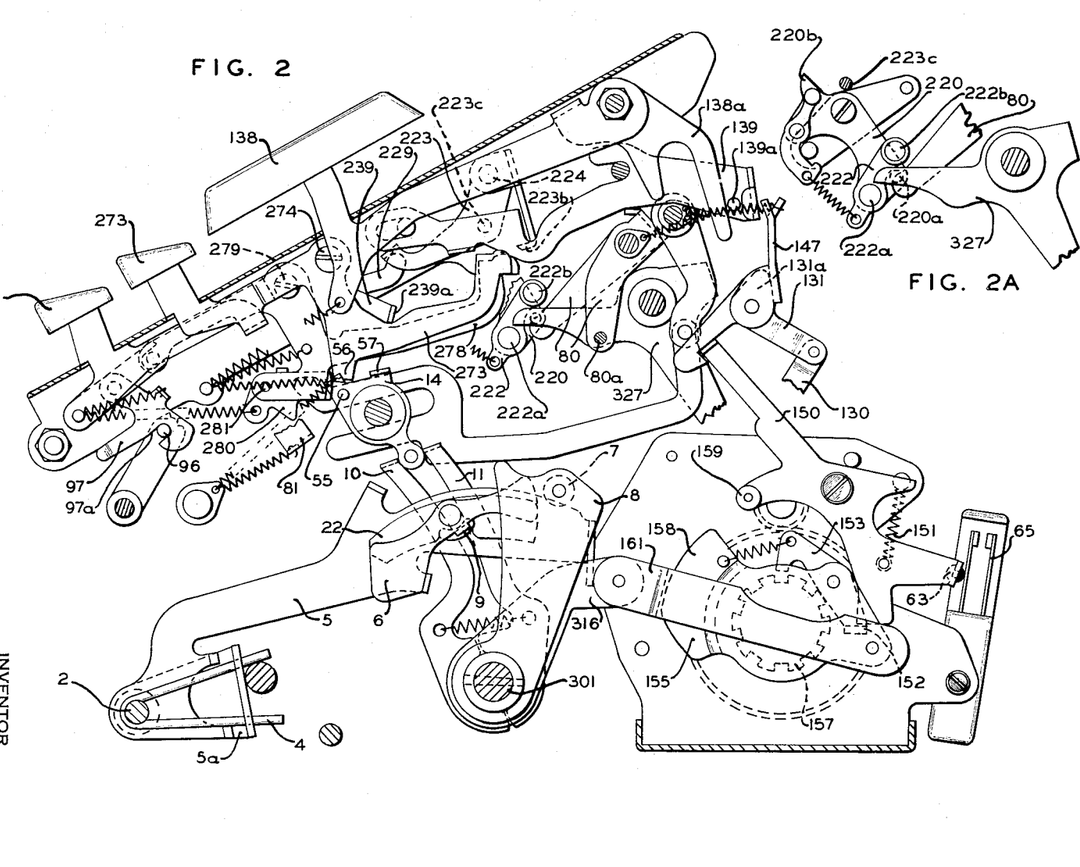
FIG. 2 is a right side elevation in section showing the total and sub-total keys, the drive mechanism, and the means for controlling meshing and unmeshing of the accumulator wheels with the actuator racks.
FIG. 2A is a fragmentary view showing the mechanism governing the unlatching of the total and sub-total keys.
Figure 3:
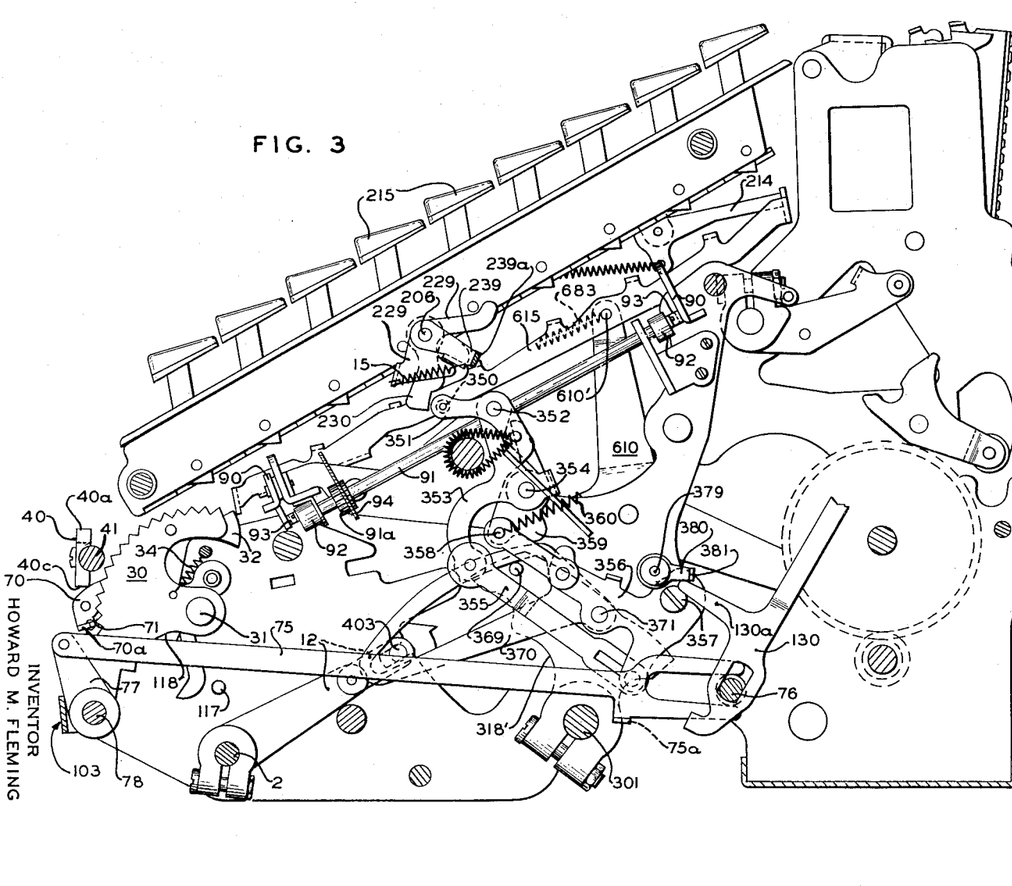
FIG. 3 is a right side elevation showing the digital storage devices and means for controlling various operations during a total-taking operation.

Referring to FIGS. 1, 2, and 3, the accumulator shaft 403 is slidably mounted in guide slots of the machine framing so that the accumulator assembly can be moved radially of the actuators 610 to mesh and unmesh the accumulator pinions 472. The accumulator assembly is normally maintained in rearward active position, with pinions 472 meshed with the actuators 610 against the tension of suitable springs, by a toggle linkage 12 one member of which is fastened to a rock shaft 2. Loosely mounted upon shaft 2 is an arm 5 attached through a yieldable U-spring connection 4 to a plate 5a fixed to the shaft. Pivotally mounted on the rear end of arm 5 is a switch cam 6 which, with flange 22 of arm 5, lies in the plane of movement of a roller 7 provided on an arm 8 fixed to the rock shaft 301.

As is well known in the art and described in detail in the aforementioned Patent No. 2,055,623, cam 6 is adapted to be rotatably set to any one of three positions for add, subtract, and non-add operations by lever 3 which acts through suitable linkage to govern the angular position of a rock lever 14. Lever 14 in turn controls the angular setting of switch cam 6 through a pair of spring pressed arms 10 and 11 embracing lug 9 of said cam. As seen in FIG. 2, lever 14 is normally spring urged to counterclockwise position for addition, and is adapted to be rocked clockwise by operation of lever 3 either a partial or a full step of movement for non-add and subtractive operations respectively. In additive and subtractive operations, roller 7 will cooperate with cam 6 and flange 22 to selectively rock shaft 2, and thereby break toggle 12 to permit unmeshing of the accumulator pinions 472 from the actuator racks 610, in the first half of the cycle for addition or in the second half of the cycle for subtraction. In non-add operations, the setting of switch cam 6 is such that the pinions 472 will remain meshed with the actuators 610 throughout the cycle whereby a value set in the keyboard is subtracted from the register on the forward stroke of the actuators and is then reentered on the return stroke.

Toward the end of the cycle of operation, a cam projection 158 of clutch plate 155 will engage a roller 159 of clutch control lever 150 and will force said lever back to the latched position of FIG. 2, thereby opening the motor switch 65 and bringing the lower end of lever 150 into the path of movement of lug 152 of clutch pawl 153 to disengage the pawl from driving member 157 and thus terminate the cycle of operation.

PRINTING

At the mid portion of the cycle, printing is effected by the type bars 611. As set forth in detail in my Patent 2,645,417, issued July 14, 1953, the type bars are operated by spring charged hammers 246 adapted to be restrained against rearward operating movement by latches 252 which are controlled by an overlying transverse bail 256 journalled on a fixed shaft 253. A vertical arm 261 (FIG. 8) pivoted to the left side of bail 256 governs the movement thereof, and is normally held in lowered position against the tension of a spring 259 by a lever 264, a nose 263 of which engages the upper end of a laterally offset depending projection 262 of arm 261. A rock shaft 302 driven in time with the main drive shaft 301 to rock counterclockwise and then return, has fixed thereto a crank arm 268 provided at its free end with a roller 267 received within a cam slot 266 of lever 264.

Figure 8:
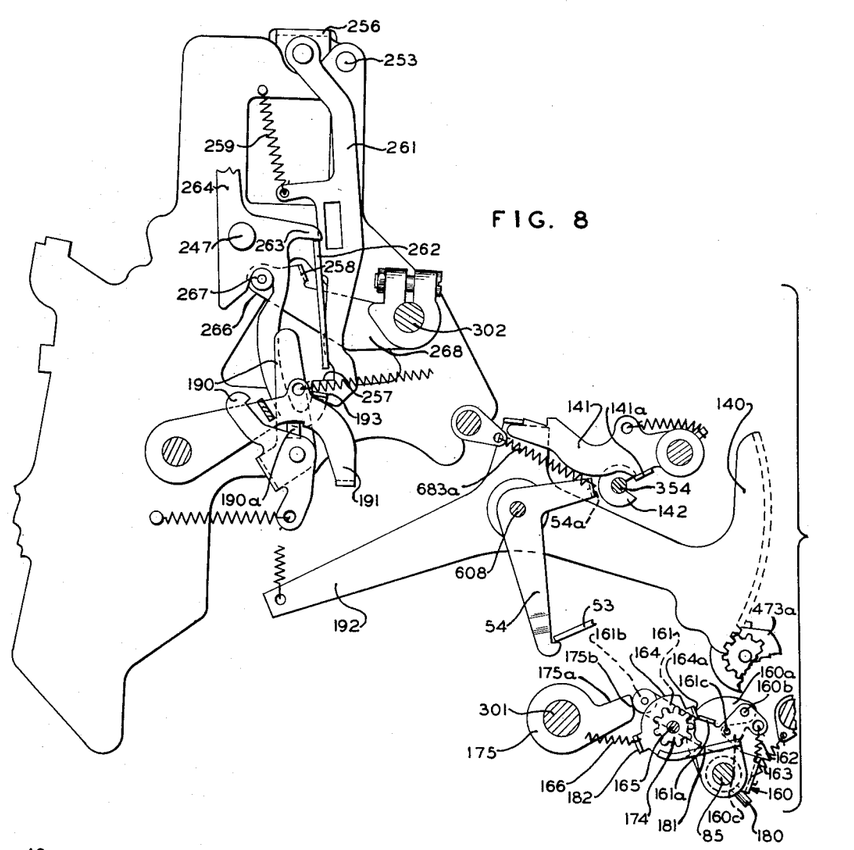
FIG. 8 is a left side elevation showing the overflow rack of the registering mechanism, the overdraft control devices, and means for suppressing operation of the printing mechanism during the first cycle.

During the counterclockwise movement of shaft 302 and crank arm 268, roller 267 will cam lever 264 counterclockwise about pivot 247 to raise projection 263 and allow upward movement of arm 261 and bail 256 therewith. The active latches 252 will thereupon be free to rise under the influence of their springs 248 until stopped by engagement with lugs 254 of the related type bars 611. Arm 261 is provided with a depending hook 257 which will be engaged by a lug 258 of crank arm 268 near the end of the forward stroke, depressing bail 256 and thereby tripping latches 252 to permit the hammers 246 to be hurled rearwardly against the type bars by springs 248. The return clockwise movement of crank arm 268 in the second half of the cycle will restore lever 264 clockwise and will also permit arm 261 to rise until its projection 262 engages nose 263 of lever 264, the final normal position of the parts being as shown in FIG. 8.

POSITIVE TOTAL AND SUB-TOTAL

As is well known, in machines of this type totals are printed by first disengaging the actuator racks 610 from their column latches 214, and thereafter from the frame 616 by tripping dogs 617 in successive order from right to left, allowing the racks to move forward subtractively under the influence of their springs 683 to rotate the accumulator wheels to zero, in which position the wheels are held by engagement with appropriate zero stops. Following this, the cycling of the machine will effect operation of the printing means at the end of the forward stroke of the operating means, the type bars 611 having been set to the total value by the forward excursion of the racks; in the return stroke, dogs 617 will pick up and return the actuators to home position. Successive release of the racks 610 is essential since the "crawl" carry mechanism employed between the numeral wheels causes every unit of movement of a lower order wheel to transmit one tenth of a unit of movement to the next higher order wheel. Therefore, in zeroizing, as each lower order wheel is returned to zero it will subtract from the next higher order wheel the fractional movement previously transmitted.

Total key

The above functions are effected in response to depression of a normally raised total key 278 (FIG. 2) fulcrumed in the fixed framing at 279.

Figures 4, 5, 5A, 5B, 10, 11:
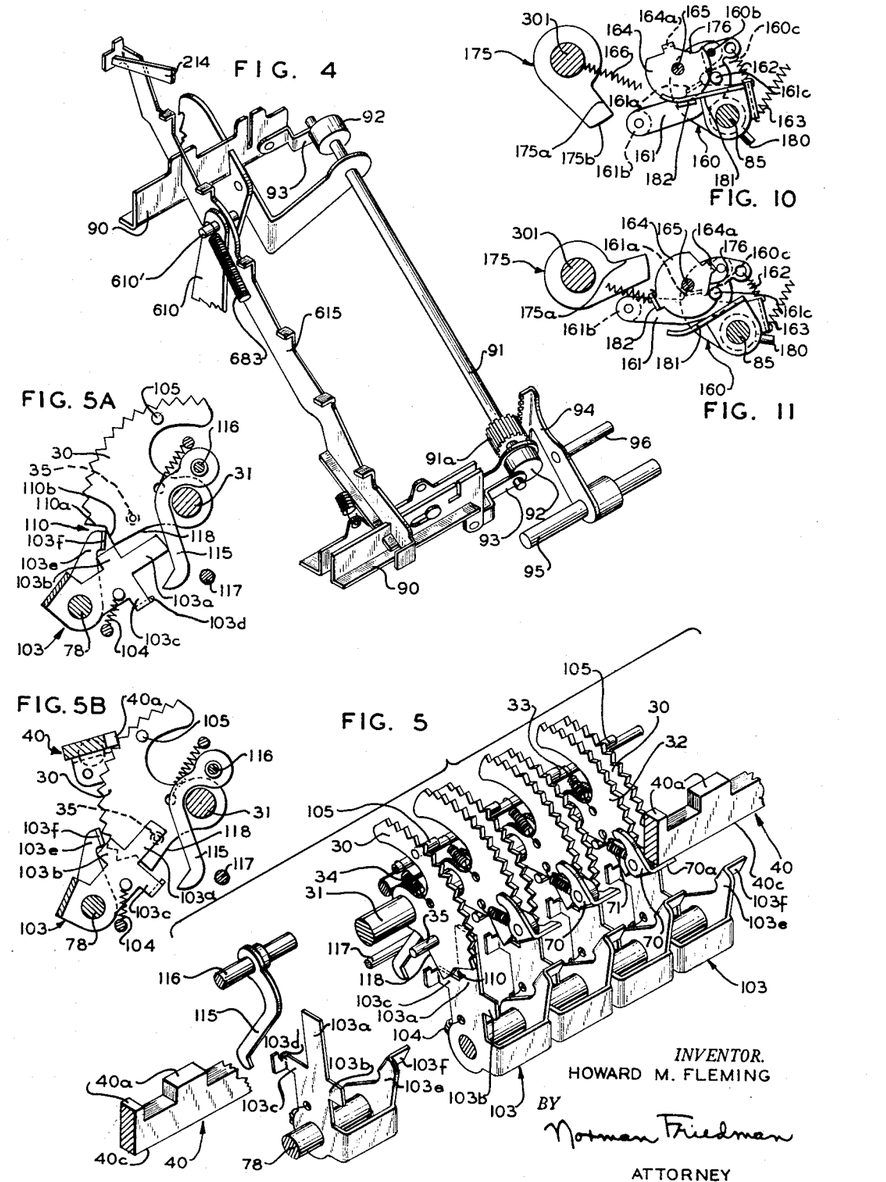
FIG. 4 is a perspective view showing the means for freeing the index bars from the column latches and digit key stems in response to depression of the total key.
FIG. 5 is a fragmentary perspective view showing the digital storage segments and associated mechanisms.
FIGS. 5A and 5B are fragmentary right side elevational views showing different positions of adjustment of the storage segments and associated mechanism.
FIGS. 10 and 11 are fragmentary left side elevations showing the position of the overdraft control devices at the end of the forward and return strokes respectively of the first cycle.

Means are provided to free the index bars 615 from their respective column latches 214 in response to depression of total key 278 by shifting the index bars laterally to the right out of engagement with the latches. For this purpose, the index bars 615 are supported near their ends in laterally slidable plates 90 (FIGS. 1, 3, 4). The sliding movement of plates 90 is governed by a rock shaft 91 provided at its ends with drums 92 which are coupled to hte right-hand ends of plates 90 through eccentric cranks 93. A pinion 91a fixed to a forward portion of shaft 91 is meshed with the teeth of a rack 94 journalled for rotation on a fixed shaft 95. A lateral pin 96 fixed to rack 94 is received within a slot 97a of a vertically movable member 97 (FIG. 2) which has suitable well-known link connection with the stem of total key 278 for downward movement therewith. Depression of key 278 will therefore move rack 94 downwardly, rocking shaft 91 clockwise (FIG. 4) to shift plates 90 and index bars 615 to the right through eccentric cranks 93 whereby the index bars are laterally displaced out of the effective range of the column latches 214 and the stems of digit keys 215. It may be noted that the index bars 615 are slidably mounted on the elongated pivot pins 610', which couple said bars to the actuators 610, so as to permit the lateral shifting movement described above.

Zeroizing

Operation of total key 278 will be effective to initiate a successive zeroizing of the register wheels 473 as follows. Referring to FIGS. 2 and 3, a crank 239 is loosely pivoted on a transverse rock shaft 206 and is formed with a lateral projection 239a which overlies the rear stem portions of both the total key 278 and the sub-total key 273. Fixed to shaft 206 is a bell crank 229 connected to arm 239 by a heavy spring 15. Depression of the total key will therefore rock bell crank 229 and shaft 206 counterclockwise through crank 239 and spring 15, imparting like movement to a trip member 230 secured to the shaft. In such movement, member 230 will engage a stub 350 fixed to a lever 351 fulcrumed at 352 upon a supporting arm 353 pivotally mounted upon a rock shaft 354 (FIGS. 1, 3) journalled in the fixed framing of the machine. Arm 353 has link connection 355 with an arm 356 which is pivotally supported at 357 in the fixed framing and which constitutes one arm of a normally set toggle, the other arm of which has pivoted connection at 358 with an arm 359 fixed to shaft 354.

Engagement of trip member 230 with stud 350 imparts clockwise movement to arm 353 about shaft 354, and through link connection 355 also imparts rearward movement to toggle 356 sufficient for a suitable spring 360 to complete the rearward movement thereof, whereby shaft 354 is rocked counterclockwise. Counterclockwise movement of shaft 354 effects operation of the successive zeroizing devices in the manner fully set forth in Patent No. 2,261,341 issued to L. P. Crosman on November 4, 1941. As described in said patent, operation of the zeroizing devices is effective to trip the dogs 617 and thus free the actuators 610 for forward movement under the influence of their springs 683, and is also effective to move hook-shaped zero stops 367 (FIG. 1) forwardly into the path of movement of shoulders 457 of the related numeral wheels.

When the highest order accumulator wheel has been rotated subtractively to its zero position, the zeroizing means imparts clockwise movement through suitable link connection (not shown) to a transverse shaft 379 (FIG. 3) upon the right end of which is fastened an arm 380. Arm 380 is provided with a projection 381, adapted in said clockwise movement to engage the underlying shoulder 130a of a vertical slide 130 pivotally connected at its upper end (FIG. 2) to a bell crank 131. In the ensuing clockwise movement of bell crank 131, the upper arm 131a thereof imparts like movement to latch 147 thereby releasing clutch control lever 150 to effect a cycle of motor operation by closing motor switch 65 and permitting clutch pawl 153 to engage the driving clutch member 157. The machine being put in operation, frame 616 will carry the dogs 617 forwardly so that they will snap under the studs 659 of the actuator levers 610. Printing will be effected at the end of the forward stroke as described earlier, and upon rearward movement of frame 616 the actuators will be picked up and restored to normal position by dogs 617.

Following the printing operation at the end of the forward stroke, the total shaft 354 is restored by engagement of pin 369 of a cam arm 318' (FIG. 3) with a lever 370 fulcrumed to toggle arm 356 at 371, thereby normalizing the zeroizing mechanism which include, inter alia, restoring the zero hooks 367 rearwardly to normal ineffective position. The normalizing of the zeroizing devices also causes arm 380 to be rocked upwardly to its normal position of FIG. 3, freeing slide 130 for upward movement to permit latch 147 to return to latching position for terminating machine operation at the conclusion of the cycle. It should be noted that the various actuators 610 depending upon their different extents of digital adjustment, may not be picked up by dogs 617 until a portion of the return stroke has been completed, and that the actuators therefore could snap forward an additional amount because of the prior removal of the zero hooks 367. Accordingly, suitable means is provided to block the actuators against forward movement from the end of the forward stroke until the end of the return stroke. As will be described subsequently in greater detail in connection with true negative totals, this means includes a pivoted bar 40 adapted to be rocked counterclockwise into latching engagement with the forward serrated edges of rotary segments 32 which are spring urged to abut the forward ends of the index bars 615.

Total key latching

The previously described counterclockwise movement of bell crank 229 in response to depression of total key 278 also serves to latch the key in operated position in the manner described in Patent No. 2,087,182 issued July 13, 1937, and the aforementioned Patent 1,915,296. For this purpose there is provided a latch 223 pivoted in the fixed framing at 224 and formed at its forward end with a lateral projection adapted to be engaged by an underlying terminal nose of the horizontal arm of bell crank 229. Accordingly, depression of key 278 will rock latch 223 clockwise and when the key has been rotated counterclockwise about its pivot 279 to operated position, a horizontal lug 223b formed at the lower end of a depending tail of the latch will have moved into latching position beneath the rear hook end of the key stem.

Near the end of a cycle of operation, latch 223 will be tripped to release the total key as disclosed in the aforementioned Patent No. 2,087,182. For this purpose there is provided a lever 327 which is adapted through suitable linkage to be rocked clockwise from its normal position of FIGS. 2 and 2A and then returned, in time with the cycling of the machine. A pawl 222, fulcrumed at 222a to a pivotal latch striker plate 220, is provided at its upper end with a roller 222b which engages lever 327. On its upward stroke, the lever will swing pawl 222 counterclockwise and then move to a position above the pawl, and thereafter on the downward stroke will cause the pawl to operate plate 220 clockwise by urging roller 222b against a pin 220a of the plate. A tooth 220b of the plate will accordingly engage a pin 223c of latch 223 and trip the latter counterclockwise allowing the total key to return to unoperated position.

It will be noted that the zeroizing mechanism, even though it is restored prior to unlatching of the total key 278, will not be retripped by engagement of stud 350 with the operated trip member 230. As supporting arm 353 is restored counterclockwise, stud 350 will snap under member 230 and will remain so positioned until the total key (and member 230 therewith) are unlatched at the end of the cycle, permitting lever 351 to be spring returned clockwise relative to member 230 and supporting arm 353, to the final normal position shown in FIG. 3.

Depression of the total key 278 also serves to set the switch cam 6 for subtractive operation whereby the register, which will be cleared by the initial zeroizing operation, will be held out of mesh with the actuator racks 610 during the return stroke of the machine, and will therefore stand in cleared condition at the conclusion of the cycle. A dog 280 pivoted to the total key stem at 281 is normally spring biased clockwise to the position shown in FIG. 2 wherein said dog extends slightly to the rear of the adjacent vertical edge of the stem. Upon depression of the total key, dog 280 will engage a pin 55 fixed to lever 14 and impart thereto a full step of clockwise movement thus setting switch cam 6 for subtractive operation. As will be described subsequently in connection with the taking of a true negative total, dog 280 is adapted to be rocked counterclockwise out of engagement with pin 55 to permit lever 14 to be partially returned counterclockwise by its spring to non-add setting as determined by abutment of pin 55 with the adjacent vertical face of the stem of total key 278.

Sub-total

The sub-total key 273 (FIG. 2) is pivotally mounted in the machine framing at 274 and is effective to initiate a total-taking operation substantially in the manner of total key 278, with the exception that upon depression of key 273, a depending projection 56 thereof will engage a lug 57 of lever 14 and rock said lever clockwise a partial step of movement. Thus, switch cam 6 is set in position for non-add operation whereby the total subtracted from the accumulator is restored thereto during the return stroke of the actuators 160.

TRUE NEGATIVE TOTAL AND SUB-TOTAL

It will be understood that a negative total will stand in the register 473 as the complement of the true negative total and would so be printed if the total were taken in the manner described previously. According to the present invention, normally disabled mechanism is provided which is rendered operative upon initiation of a total-taking operation to convert a complemental negative total to a true negative total and print the latter, in two consecutive cycles of machine operation. Upon depression of total key 278, zeroizing is effected as usual during which the actuators 610 set suitable digital storage members to the complemental negative value. Printing is suppressed for the first cycle and the storage members are held locked in digitally adjusted position while the actuators are restored on the return stroke of the cycle.

In the second cycle the actuators are permitted to move forwardly under the control of the storage members, during which the storage members will move forwardly from their positions of complemental adjustment to positions corresponding to a value of 9. In other words, the digital excursion of the storage members and of the actuators and type bars 611 controlled thereby, will be proportional to the complement of the complemental total, which is the true negative total. To provide for the fugitive one the storage member of the first significant order, i.e., the lowest order in which a significant digit of the total appears, will be permitted an extra step of movement to a value position of 10. Further, the storage devices to the right of the first significant order will be held blocked against forward movement during the forward stroke of the second cycle to maintain the related type bars at their normal position of zero registration. Thereafter, the printing mechanism will operate in usual fashion to effect printing of the true negative total at the mid-portion of the cycle.

Overflow rack

Whenever a negative total value (registered as the complement of the true negative total) has been accumulated upon the register wheels 473, a successive zeroizing operation of the register wheels, effected in response to depression of total key 278, will include a complemental nines registration carried up to the highest order numeral wheel 473a (FIG. 8). The rack 140 associated with wheel 473a is similar to the actuators 610, but has no index bar connection with the keyboard or column latch 214, and is not provided with a type bar. Wheel 473a merely receives tens transfer from the adjacent lower order and together with rack 140 serves as an overflow order of the registering mechanism to sense an overdraft condition of the register by movement of the rack to nine position and to thereupon adjust the overdraft control devices of the invention for effective operation. Rack 140 is normally held restrained in home position by a latch 141 which is tripped whenever a total is taken. As described previously, operation of the zeroizing devices is effected upon depression of total key 278 by rotary movement of the total shaft 354. As viewed in FIG. 8 this rotary movement is clockwise and will cause a radially slotted collar 142 fixed to the total shaft to engage a lug 141a of latch 141 and trip the latch counterclockwise, thereby enabling rack 140 to be moved forwardly (clockwise) by spring 683a upon tripping of the associated dog 617 in a successive zeroizing operation. In the return stroke of the machine the dog will pick up and restore rack 140 to latched position, where the rack will remain during the second cycle of a negative total operation.

Storage segments

A true negative total is taken from register 473 by means of a denominationally arranged series of digital storage segments 30 (FIGS. 1, 3, 5, 6) pivotally supported on a fixed transverse shaft 31 at the front of the machine. Each segment 30 is adapted, upon forward movement of the actuators 610, to be differentially adjusted counterclockwise from its normal position of rest an angular distance proportional to the value standing in the related register wheel. To this end, segment 30 is arranged to be driven by the forward movement of the associated actuator index bar 615 through an interponent segment 32, the ordinal series of segments 32 being rotatably supported on shaft 31 and urged rearwardly by springs 33 into engagement with the forward ends of the index bars. The forward edges of both the storage and interponent segments are serrated for a purpose to be described shortly. A spring 34 biases segment 30 clockwise to normal position wherein a pin 35 fast therewith abuts the lower edge of interponent 32. In a zeroizing operation, therefore, the forward digital excursion of actuators 610 and index bars 615 under the urge of springs 683 will effect a like digital setting of storage segments 30 through the unidirectional coupling provided by interponents 32 and pins 35.

If the total is positive, it will be printed by the type bars 611 at mid-cycle as usual, and thereafter the storage segments 30, under the influence of springs 34, will follow interponents 32 and index bars 615 back to home position during the return stroke of the machine. However if the total is negative, printing will be suppressed and a suitable locking means will be rendered effective to hold storage segments 30 locked in complementally adjusted position against the restoring urge of springs 34 throughout the return stroke of the actuators 610 and segments 32.

This locking means comprises a series of spaced upwardly extending projections 40a, each adapted for cooperation with the serrated edge of a related storage segment 30, formed in an elongated bar 40 which extends across the machine forwardly of the row of segments 30 and 32. Bar 40 has rigidly secured to its opposite ends aligned circular shaft portions 41 which are journalled in the fixed framing and thereby support the bar for rotation. A push link 42 (FIG. 6) is pivotally connected at 43 to a bracket 40b fast with bar 40, and is adapted to be moved upwardly to selectively rock the bar in either counterclockwise or clockwise direction from its normal vertical position. Counterclockwise movement of bar 40 will bring projections 40a into latching engagement with only the storage segments 30, the interponent segments 32 being aligned with the slots between said projections; while clockwise movement of the bar will bring its lower uninterrupted edge 40c into latching engagement with the serrated edges of interponent segments 32 (and incidentally the storage segments 30) thereby blocking the actuators 610 against forward movement. In this regard, it will be recalled that mention was made earlier of the desirability, in positive total taking, for holding the actuators blocked against forward movement before they are picked up and restored by dogs 617 in the return stroke.

Push link 42 is adapted to rotate bar 40 either clockwise or counterclockwise as follows. The bar is normally disposed vertically in which position its point of pivotal connection 43 with push link 42 lies to the rear of the bar's horizontal axis of rotation. Accordingly, upward movement of the push link in the direction of its length will effect clockwise movement of bar 40. However when a negative total is taken, operation of the overdraft control mechanism will cause a member 44 (FIGS. 1, 9) pivoted to a bracket 45 of the bar to be moved downwardly in the forward stroke of the first cycle and rock the bar a limited distance clockwise (counterclockwise in FIG. 6) to adjust the pivot point 43 to a position forward of the bar's axis of rotation. Upward movement of push link 42 will consequently now be effective to operate bar 40 counterclockwise in FIG. 6.

Figures 6, 7:
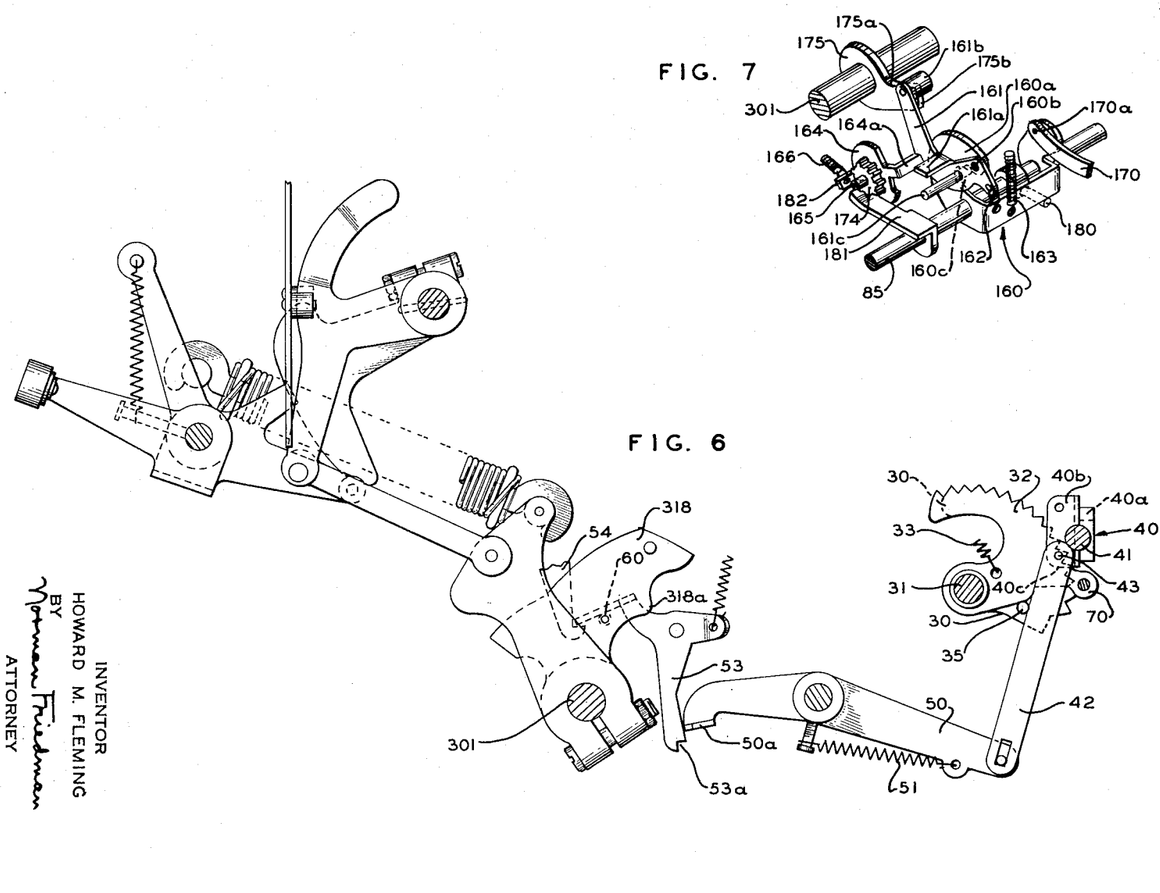
FIG. 6 is a left side elevation showing the mechanism for locking the storage segments in digitally adjusted position during the return stroke of the first cycle of a negative total-taking operation.
FIG. 7 is a fragmentary perspective view showing the overdraft control devices.

Push link 42 is operated by a spring biased bell crank 50 formed at its rearward end with a lug 50a lying in the path of a projection 318a of the previously mentioned cam 318 which is rigidly secured to the main rock shaft 301 for oscillatory movement therewith. Near the end of the forward stroke of shaft 301, cam 318 will engage lug 50a and will rock bell crank 50 counterclockwise against the tension of spring 51, causing push link 42 to rise and operate latch bar 40. If the total is positive the bar will stand in normal vertical position for clockwise operation, while if the total is negative the bar will have previously been adjusted counterclockwise by member 44 for counterclockwise operation. In either event, it is necessary in a total-taking operation that the bar be held in operated position until the end of the return stroke, for the reasons mentioned previously. To this end there is provided a latch 53 which is arranged for cooperation with lug 50a of bell crank 50, but which is normally disabled by a second latch 54 (FIGS. 6, 8). Latch 53 will be released from latch 54 to hold bell crank 50 (and therefore bar 40) in operated position throughout the return stroke as follows. As indicated earlier, depression of total key 278 will effect release of the overflow latch 141 by causing clockwise movement of the total shaft 354. Latch 54 is formed with a lateral offset 54a which lies in the path of latch 141 and will therefore be rocked clockwise upon tripping of the latter, freeing latch 53 for clockwise movement under the urge of a suitable spring. Upon counterclockwise operation of bell crank 50, lug 50a thereof will move into alignment with a notch 53a of latch 53 whereupon the latter will be allowed to swing clockwise into latching relation with the bell crank. Latch 53 will hold bell crank 50 rocked until the end of the return stroke at which time a pin 60 fixed to cam 318 will engage the latch and restore it clockwise to normal ineffective position. Bell crank 50, push link 42, and latch bar 40 will thereupon be returned to unoperated position by spring 51.

Pivoted to a forwardly extending ear of each interponent segment 32 is a pawl 70 having a lateral projection 70a urged rearwardly by a spring 71 toward engagement with the serrated edge of the related ordinal storage segment. The pawls 70 are designed to form a unidirectional latching coupling between the two segments 30 and 32 of each order, that is to say, each pawl will permit rearward movement of an interponent segment 32 relative to its storage segment 30 but will lock said segments together against rearward movement of the storage member relative to the interponent.

Accordingly at the conclusion of the first cycle of a negative total-taking operation the interponents 32 will stand in home position with the index bars 615, while the storage segments 30—even though they have been freed from the restraint of the locking projections 40a—will nevertheless be held in forward complementally adjusted position by pawls 70.

Second cycle continuing means

The machine will then automatically continue through a second cycle of operation in which the actuators 610 and index bars 615 will again move forwardly from home position under the influence of their springs 683 to positions corresponding to the true negative value, as limited by the storage segments 30 contacting with suitable stop means which will be described shortly. It will be recalled that when a positive total is taken, the operation of the highest order zeroizing device causes arm 380 (FIG. 3) to lower slide 130 (see also FIG. 2) and thereby trip latch 147 to initiate motor operations, slide 130 being allowed to rise subsequently in the cycle to permit the latch to return to latching position and consequently terminate operation of the machine after a single cycle. If the total is negative, however, slide 130 will be held blocked in lowered position, preventing latch 147 from operating until after the power drive mechanism has begun a second cycle of operation. For this purpose there is provided an elongated horizontal member 75 slidably supported at its rear bifurcated end on shaft 76 and adapted to be operated by an arm 77 fixed to a rock shaft 78. Member 75 is normally in forward position as seen in FIG. 3. When a negative total is taken, the overdraft control devices will be effective during the first forward stroke of motor operation to rotate shaft 78 and arm 77 clockwise and thus shift member 75 rearwardly, positioning a lug 75a thereof in overlying blocking relation with the lower hook end of the depressed slide 130. Slide 130 will remain so blocked until the second half of the second cycle, at which time shaft 78 will return to normal position, freeing slide 130 from lug 75a whereby latch 147 is allowed to terminate motor operation in usual fashion.

In order that the index bars 615 be free for forward movement in the second cycle, the total key 278 will be prevented from being unlatched in the first cycle and will thereby maintain the index bars shifted to the right out of the range of the column latches 214. The release of the total key from its latch 223 is prevented by a lever 80 (FIGS. 2, 2A) which is adapted to be rocked clockwise to engage roller 222b of the latch-release pawl 222 and swing said pawl counterclockwise an amount sufficient to render the pawl ineffective to actuate the latch striker plate 220 upon downward cyclic movement of lever 327.

Further, switch cam 6 which is adjusted to subtractive setting for the first cycle by depression of the total key in the manner described earlier, will be adjusted to non-add setting for the second cycle of the negative total-taking operation, whereby the true negative value substracted from the register 473 in the forward stroke of the second cycle will be restored thereto during the return stroke. It will be recalled that depression of the total key 278 (FIG. 2) will cause dog 280 pivoted thereto to swing rock lever 14 a full step of movement clockwise to effect subtractive setting of switch cam 6. Before the second cycle has commenced, a lever 81 pivoted to the inside of the right side framing plate 82 will be rocked counterclockwise to engage and swing dog 280 in like direction, permitting rock lever 14 to return counterclockwise to non-add position as limited by abutment thereof with the adjacent vertical shoulder of the total key stem.

Both levers 80 and 81 are operated by a three-armed member 83 (FIG. 12) pivoted on the outside of framing plate 82. Member 83 comprises a rear arm 83a formed with a cam slot 83b which embraces a pin 80a of lever 80; a forward arm 83c overlying a lateral offset 81a of lever 81 (said offset extending through an opening in framing plate 82 into the plane of arm 83c); and a depending arm 83d having fast at its lower end a pin 83e received in a slot of a crank arm 84 fixed to a rock shaft 85. Member 83 is normally maintained in the clockwise position of FIG. 12 against the tension of a heavy spring 86 by crank arm 84, shaft 85 and said crank arm being held blocked in counterclockwise position by suitable means the details of which will be described hereinafter in connection with the overdraft control devices. Shortly after the middle of the first cycle, shaft 85 will be freed from its blocking means, permitting spring 86 to rock member 83 counterclockwise and shaft 85 clockwise. In this movement cam slot 83b will swing lever 80 clockwise to prevent the total key from being unlatched, and arm 83c will swing lever 81 counterclockwise to change the setting of rock lever 14 from subtractive to non-add position. Member 83 and shaft 85 will remain in operated position until the return stroke of the second cycle when the shaft will be power-restored to the position of FIG. 12, returning member 83 to normal position and recharging spring 86. Lever 80 will therefore be rendered ineffective and will thus permit unlatching of the total key 278 in the second cycle, and dog 280 will be free to be spring-returned to its normal position relative to the stem of the total key.

*Limit stop means for the storage segments*

In the first half of the second cycle the actuators 610, index bars 615, and interponent segments 32 will again be moved forwardly from home position by springs 683, driving the complementally adjusted storage segments 30 in like direction by means of the pawls 70. The forward movement of the parts will now be limited by suitable "nine-stop" means which are positioned to be engaged by said storage members 30 upon movement of the latter to a digital value position of 9. Since the storage segments stood in complementally adjusted position at the beginning of the second cycle (the complemental negative total having been transferred thereto from register 473 in the initial zeroizing operation), their subsequent travel to 9 position will be of a magnitude corresponding to the nines complement, i.e., the true negative value, of the corresponding ordinal digits of the complemental total. At the conclusion of the forward stroke therefore, the type bars 611 will register the true negative value which will thereupon be printed in normal fashion, the index bars 615 having partaken of the same magnitude of digital excursion as the storage segments 30 and having then been blocked against further movement by means of pawls 70 cooperating with the serrated edges of the segments. To provide for the fugitive one the storage segment of the first (lowest) significant order is not stopped at 9 position as are the higher order segments but is permitted an additional increment of movement to a value position of 10. Further, to effect printing of the zeros to the right of the first significant order, the storage segments 30 (and therefore the actuators 610) of these right-hand orders will be held blocked against forward movement during the second cycle whereby the corresponding type bars will remain at their normal zero setting.

The above functions are effected by a denominational series of bail-shaped members 103, one such member being provided for each order of the machine, loosely journalled on the rock shaft 78 and tensioned rearwardly (clockwise in FIGS. 1, 3; counterclockwise in FIG. 5) by springs 104. The left-hand upstanding arm 103a of each bail 103 is formed with oppositely directed horizontal fingers 103b and 103c respectively, the rearwardly directed finger 103c having a lateral offset 103d; while the right-hand arm 103e of the bail terminates in a lateral tongue 103f which overlaps the forwardly directed finger 103b of the adjacent lower order bail. The previously described crank arm 77 (FIG. 3) is fixed to rock shaft 78 between the arms of the rightmost bail 103, and in its normal counterclockwise position holds the bail forward against the tension of the bail spring 104, the successive higher order bails being held in like position by the overlapping fingers and tongues 103b, 103f. With any bail 103 so disposed in forward position, the upper edge of its left-hand arm 103a is adapted to be engaged by a stop pin 105 fixed on the right side of the adjacent higher order storage segment 30 upon movement of the segment to 9 position. Said arm 103a thereby serves as the nine-stop means mentioned earlier.

As hereinbefore described, crank arm 77 is rocked to the rear in the first half of the first cycle for the purpose of operating member 75 to continue the machine through the second cycle. The movement of crank 77 will permit the bails 103 to move—under the tension of their springs 104—in like direction from forward active position to either one of two possible rearward ineffective positions in which the nine-stop arms 103a no longer stand in the path of pins 105, as determined by engagement of a bail with its ordinally related storage segment 30. The bail of the first significant order and the bails to the left thereof will be permitted only a partial movement to the rear, while the right-hand bails will be permitted a full step of rearward movement which will place said latter bails in position to prevent forward movement of the associated zero registering storage segments. Thereafter in the first cycle, the partially rocked bails will be restored by suitable means to forward effective nine-stop position for cooperation with the storage segments in the second cycle, said means being ineffective to restore the fully rocked bails.

Each storage segment 30 is formed at its lower end with a notch 110 defined by converging shoulders 110a, 110b. When the segment is in home position the notch 110 lies in the path of the lateral tongue 103f of the ordinally related bail 103 and can therefore be entered by said tongue to permit a full step of rearward movement of the bail upon rearward movement of crank arm 77 (FIG. 5A). However, if the segment 30 has been rocked forwardly to a digitally adjusted position of 1 or higher in the zeroizing operation, its serrated edge will stand in the path of tongue 103f and will permit only a partial step of rearward movement of the bail (FIG. 5B). The bail of any zero order to the left of a significant digit will also be limited to a partial step of movement by means of its tongue 103f contacting with the finger 103b of the adjacent right-hand bail.

During the return stroke of the first cycle the partially rocked bails 103 will be restored forwardly to place their nine-stop arms 103a in the path of the segment pins 105 of the adjacent higher order segments 30 by means of a series of hooks 115 securely fastened on a transverse rock shaft 116. The hooks 115 are normally in rearward position, and are adapted upon clockwise rotation of shaft 116 to engage the offsets 103d of the partially rocked bails and return said bails to forward nine-stop position. The offsets 103d of the fully rocked bails, however, lie below the path of hooks 115 and the hooks will therefore be ineffective to restore these bails.

Accordingly, at the conclusion of the first cycle of a negative total-taking operation the first significant bail 103 and the bails to the left will stand forwardly with their nine-stop arms 103a in effective position to be engaged by the stop pins 105 of the storage segments 30 to the left of the first significant order; and the bails to the right of the first significant order will stand fully rocked to the rear with their tongues 103f positioned below shoulders 110a of notches 110 thereby serving to block the corresponding segments in home position. It will be noted that since the nine-stop arm 103a for the storage segment 30 of the first significant order is a part of the adjacent right-hand bail, said arm 103a will ineffectively lie to the rear of the path of the segment stop pin 105. The forward excursion of said first significant storage segment in the second cycle will now be limited by a fixed transverse shaft 117 which extends across the machine beneath the segments and is positioned to be engaged by the lower edge 118 of any storage segment upon movement thereof to a value position of 10, thus providing for the fugitive one.

The restored bails 103 will be held forwardly by hooks 115 throughout the forward stroke of the second cycle during which the first significant storage segment 30 will be driven into engagement with the ten-stop shaft 117, the segments to the left will be driven into engagement with the nine-stop arms 103a, and the right-hand segments will remain blocked in home position by tongues 103f. As previously explained, such movement of the storage segments (and the actuators controlled thereby) is proportional to the true negative value which will thereafter be printed by the type bars 611 at mid-cycle.

In the return stroke of the second cycle, shafts 78 and 116 will both be restored counterclockwise (FIGS. 1, 3) by the overdraft control devices to normalize bails 103 and hooks 115 respectively, and the actuators 610 will be picked up and restored by the dogs 617. The interponent and storage segments 32 and 30, under the influence of their respective springs 33 and 34, will follow the index bars 615 rearwardly, and near the end of the stroke pawls 70 will be swung out of latching engagement with the serrated edges of the storage segments by contacting the lower uninterrupted edge 40c of bar 40. Any complementally adjusted storage segment 30 is thereby released to return to normal position relative to its interponent segment 32 as determined by abutment of pin 35 of the former with the underside of the latter. At the conclusion of the second cycle, therefore, the parts will again stand in the normal unoperated position of FIG. 1.

Figure 9:
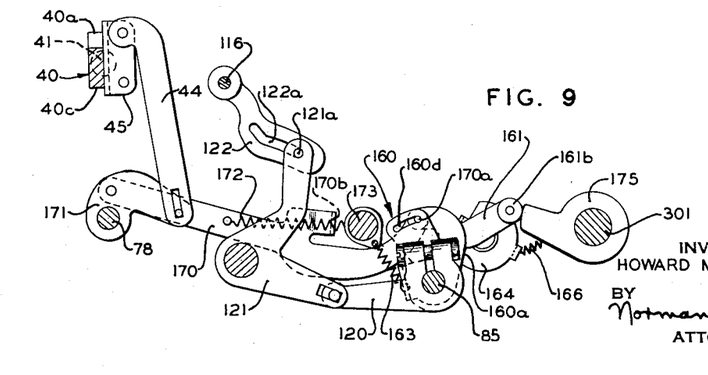
FIG. 9 is a fragmentary right side elevation showing the overdraft control devices and mechanism controlled thereby.

The rocking movement of shaft 116 upon which the bail-restoring hooks 115 are mounted is governed by shaft 85. As hereinbefore described, shaft 85 controls the operation of the three-armed member 83 and is rocked clockwise in FIGS. 9 and 12 during the return stroke of the first cycle and is then restored in the return stroke of the second cycle. Referring to FIG. 9 a crank 120 fixed to shaft 85 has pin and slot connection with one leg of a bell crank 121, the other leg of the bell crank having fast therewith a pin 121a received in a cam slot 122a of an arm 122 fixed to shaft 116, the arrangement being such that rotation of shaft 85 will effect rotation of shaft 116 in like direction.

Overdraft control devices

Loosely pivoted upon shaft 85 is a bail 160 (FIGS. 7–11) on whose left-hand arm 160a is pivoted at 160b a lever 161 provided with an intermediate lateral projection 161a and a rear terminal roller 161b. A spring 162 connected between bail 160 and lever 161 urges the latter clockwise on the former to the position shown in FIGS. 7 and 8 as limited by a through pin 161c of the lever seating in a V-slot 160c formed in the bail. Bail 160 is normally held in counterclockwise position against the tension of a spring 163 by the lever projection 161a engaging an offset 164a of a disc 164, disc 164 being rotatable on a fixed shaft 165 and urged to clockwise position abutting a suitable stop (not shown) by a spring 166.

A link 170 (FIGS. 7, 9) is provided at its rear end with a pin 170a embraced by a slot 160d formed in the right-hand arm of bail 160. At its forward end, link 170 is pivotally connected to an arm 171 which is rigidly connected to shaft 78 and which has pin and slot connection with member 44. It will be recalled that shaft 78—through crank arm 77 mounted thereon (FIG. 3)—controls the angular position of the stop-bails 103 journalled on shaft 78, and also controls operation of member 75 for the purpose of continuing the machine through the second cycle of a negative total operation. It will further be recalled that downward movement of member 44 serves to adjust latching bar 40 for negative total operation. Link 170 is adapted to be operated in rearward direction by a spring 172 to effect clockwise rotation of shaft 78 and downward movement of member 44, but is normally blocked in forward position by pin 170a engaging the rearward end of slot 160d thereby maintaining shaft 78 and crank arm 77 in counterclockwise position and member 44 in raised position. During the forward stroke of the first cycle of a negative total taking operation, bail 160 will be permitted to rock rearwardly under the action of its spring 163, allowing spring 172 to operate link 170 in like direction as limited by an offset 170b of the link engageable with a shaft 173. Bail 160 will thereafter be restored in the second half of the second cycle to normalize link 170.

The movement of bail 160 is governed as follows. A pinion 174 (FIGS. 7,8), fixed to disc 164 for concentric rotation therewith about shaft 166, lies in the plane of the overflow rack 140 and is positioned in meshable relation with the rack teeth, that is to say, the pitch diameters of the rack and pinion are tangent to one another. However, the spacing between rack 140 and pinion 174 is such that they will mesh only upon movement of the rack from 8 to 9 position in zeroizing a negative total. Such movement, which will occur only when the total is negative as explained previously, will swing disc 164 counterclockwise to the position of FIG. 10, freeing lever 161 and bail 160 from the restraint of the disc offset 164a.

Motor operation will thereupon be initiated by arm 380 (FIG. 3) cooperating with slide 130 as hereinbefore described, causing the main rock shaft 301 to cyclically rock clockwise in FIGS. 7, 8, 10, 11 (counterclockwise in FIG. 9) and return. A crank 175 fastened to shaft 301 for oscillation therewith is effective to permit bail 160 to rock counterclockwise on the forward stroke of the first cycle, and will subsequently restore the bail in the return stroke of the second cycle. Crank 175 includes a radial side edge 175a terminating in a forward arcuate nose 175b, the latter being normally presented to roller 161b of lever 161 in home position of the parts and thereby serving to block bail 160 after offset 164a has been rendered ineffective by movement of the overflow rack to 9 position. When crank 175 has travelled downward a limited amount sufficient for nose 175b to clear roller 161b, the roller will engage edge 175a under the urge of spring 163 and will follow said edge in the continued downward movement of crank 175, permitting bail 160 and lever 161 to swing to the rear. The bail and lever will move as a unit until the lever pin 161c contacts the circular edge of the operated disc 164 (FIG. 10), said pin extending leftwardly into the plane of the disc for this purpose. Bail 160 will continue its rearward travel under the influence of spring 163, and lever 161 will consequently swing counterclockwise relative to the bail since pin 161c is blocked by disc 164 while bail 160 carries the lever rearwardly at the pivotal connection 160d therebetween. Such movement of lever 161 is sufficient to remove roller 161b from the path of crank 175, FIG. 10 showing the position of the parts at the mid-portion of the first cycle. It may be noted that the rearward movement of bail 160 is limited by the forward end of its slot 160d contacting pin 170a of link 170, whose operating movement in turn is limited by shaft 173.

In the second half of the first cycle crank 175 will be restored to home position as will the overflow rack 140. The removal of the rack from meshed relation with disc 164 will allow the latter to be spring returned to normal position, in which position a notch 176 cut therein is aligned with the lever pin 161c, whereby lever 161 will be allowed to be rocked clockwise relative to bail 160 by spring 162 to seat pin 161c in V-slot 160c and also to position roller 161b in the path of crank 175. However, the timing is such that crank 175 in returning to home position will have rocked past roller 161b before the latter is repositioned in the path of the crank; accordingly, crank 175 will merely swing idly past roller 161b. At the conclusion of the first cycle, the parts will lie in the respective positions shown in FIG. 11.

In the second cycle, crank 175 will snap under roller 161b in the forward stroke of the machine, and during the return stroke will act through said roller and lever 161 to restore bail 160 to home position.

It will be recalled that brief mention was made earlier to the effect that shaft 85 is normally blocked to prevent operation of the three-armed member 83 by spring 86. During operations other than negative total taking, this blocking function is performed by bail 160 engaging an underlying stud 180 fixed to shaft 85. Rearward movement of bail 160 in the first half of the first cycle of a negative total taking operation will release stud 180 from the restraint of said bail; however, shaft 85 must not be freed from movement until the second half of the cycle, at which time it will permit operation of member 83 (to change switch cam 6 from subtractive to non-add setting, and to prevent unlatching of the total key 278) and will also effect operation of shaft 116 which carries hooks 115 for restoring bails 103.

Supplemental blocking means is therefore provided to restrain shaft 85 against movement during the forward stroke of the first cycle. Referring to FIGS. 7 and 8, an arm 181 rigid with shaft 85 extends rearwardly to a point adjacent a lug 182 of disc 164. In the normal clockwise position of disc 164, lug 182 lies to the rear of arm 181. Operation of the disc by zeroizing movement of overflow rack 140 to overdraft (9) position will place lug 182 below arm 181 to blocking relation therewith (see FIG. 10) until the disc is restored early in the return stroke (FIG. 11). Shaft 85 is thereupon free to operate in the manner previously described. Restoration of bail 160 by crank 175 in the second half of the second cycle will return shaft 85 to home position by engagement of the bail with stud 180.

*Printing suppression*

The movement of the overflow rack 140 to 9 position is employed to suppress operation of the printing mechanism during the first cycle as follows. It will be recalled that printing is normally effected at mid-cycle by the tripping of latches 252 (FIG. 1) to release the printing hammers 246, the latches being tripped by lug 258 of crank arm 268 (FIG. 8) engaging hook portion 257 of arm 261 to depress said arm 261 and bail 256 therewith. Arm 261 is adapted to be disabled by being rocked counterclockwise out of the effective path of crank arm 268 by a spring tensioned lever 190 which is normally rendered ineffective by a latch 191 cooperating with a square stud 190a of said lever. In moving from 8 to 9 position, a rearwardly extending arm 192 of the overflow rack 140 will trip latch 191, releasing lever 190 to disable arm 261 by engagement with projection 262. In the return stroke of the first cycle latch 191 will be disengaged from arm 192 by the normalizing of rack 140, and lever 190 will thereafter be restored to ineffective latched position by a lug 193 formed on lever 264, said lever 264 being rocked counterclockwise and then returned in time with the cycling of the machine as explained earlier. The printing mechanism will subsequently operate in usual fashion during the second cycle to print the true negative total.

*Negative sub-total*

The sub-total key 273 (FIG. 2) is effective to initiate a two cycle negative total taking operation in substantially the same manner as total key 278 with the exception that upon depression of key 273, projection 56 thereof will swing rock lever 14 a partial step of movement clockwise to set switch cam 6 in position for non-add operation during both cycles. Thus, the complemental total subtracted from the register 473 during zeroizing is restored thereto during the first cycle return stroke of the actuators 610; and the true negative total subsequently is subtracted from the register and then restored during the respective forward and return strokes of the second cycle. At the completion of the operation, therefore, the original complemental negative total will stand in the register.

I claim:

1. In a calculating machine having a register comprising an ordinal series of differentially operable digital registering devices, differentially movable actuators therefor, the combination with said register of means for taking a true negative total therefrom, said means including: a stationary support shaft having pivoted thereon an ordinal series of differentially adjustable digital storage devices, an ordinal series of interponent members pivoted on said shaft, each interposed between a storage member and a related order actuator, unidirectional operating members coupling said storage devices with related ones of said interponents, means for effecting a first adjustment of said interponents by said actuator to set the storage devices to a first value condition representative of a complemental negative value standing in said register and for thereafter restoring said interponents independently of said storage devices, and means for automatically effecting a second adjustment of said interponents for setting the related storage devices to a second value condition differing from said first value condition by a digital amount equal to the complement of said complemental value.

2. The invention set forth in claim 1, including a fixed stop member for limiting the adjustment of any selected lowest significant storage device to a value of 10, stop means selectively settable for limiting the adjustment of the higher order storage devices to a value of 9 and zero stop means selectively settable to prevent operation of any storage members in orders to the right of said first significant order.

3. The invention set forth in claim 1, including ordinally arranged stop means effective to selectively limit the adjustment of said storage devices to a value of 9, a fixed stop means for limiting the adjustment of any selected lower significant storage device to a value of 10, zero stops operable for sensing said storage devices and selectively displaceable for rendering the stop means of the first significant order effective to limit adjustment of the related storage device to a value of 10 and for rendering the higher order stop means effective to limit adjustment of the related higher order storage devices to a value of 9 and for preventing value displacement of the lower order storage devices.

4. In a cyclically operable calculating machine having an ordinally arranged crawl carry register and reciprocatory differential actuators therefor; an ordinal series of digital storage devices differentially adjustable about a fixed center and operable to a first value setting in response to operation of said actuators in one direction for clearing a complemental total value from a register prior to a cyclic operation of the machine, interponent means adapted for corresponding value adjustment thereof and providing a unidirectional coupling between said storage devices and actuators effective with respect to operation of the actuators in said one direction to rigidly couple said storage devices therewith, said coupling being ineffective with respect to operation of the actuators in the opposite direction, means for restoring the actuators and said interponents in a subsequent machine cycle of operation, locking means operable during said restoring operation for holding the storage devices in their adjusted positions, and wherein the unidirectional coupling means is displaceable during said restoring movement and adapted for coupling the said interponents with their related storage segments at differentially settable positions, and stop means selectively adjustable during said first cycle of operation and subsequently cooperable with said storage devices for limiting the digital adjustment thereof incident to an operation of the said actuators in a second operation of the cyclic devices, whereby to indicate a true negative total of the said complemental total value.

5. The invention set forth in claim 4, further comprising means for causing said actuators to operate in said one direction to subtract a complemental negative total from said register and to thereby enter said complemental total into said storage devices prior to a first operation of the machine cycle devices, and means operable at the completion of said clearing operation to initiate an automatic cycle of machine operation.

6. The invention set forth in claim 4, further comprising: means for controlling a zeroizing operation of said actuators in which said actuators first move in said one direction to subtract a complemental negative total from said register and thereby effect a first value condition adjustment of said storage devices corresponding to said total, means operable following said zeroizing operation of the actuators to cause an automatic machine cycle of operation wherein the actuators are then restored in said opposite direction; and for thereupon controlling a second automatic machine cycle of operation in which said actuators again move in said one direction moving said storage devices therewith from their first value condition adjustment to a second value condition adjustment as limited by said stop means.

7. In a calculating machine having register means comprising an ordinal series of differentially operable digital registering devices and differentially movable actuators therefor; the combination therewith of an ordinal series of differentially adjustable digital storage devices, stationary support means therefor, a differentially adjustable interponent between said storage devices and a related one of said actuators, unidirectional coupling members for operating the storage devices by their respective interponents, means for effecting a first adjustment of said interponents whereby to displace therewith the related ones of said storage devices to a first value condition representative of a given value standing in the register, means for locking said storage devices in selected adjusted positions and means operable thereafter for differentially displacing the said interponents with respect to the adjusted positions of the said storage devices.

8. In a calculating machine having register means comprising an ordinal series of differentially operable digital registering devices, actuators therefor differentially displaceable in accordance with values stored upon said registers; in combination therewith an ordinal series of differentially adjustable digital storage devices, a shaft effecting fixed pivotal support for said storage devices, differentially settable elements pivoted upon said shaft and interposed between the said actuators and a corresponding order of said storage devices, unidirectional coupling means for connecting related ones of said storage devices with related ones of said settable elements, means for effecting a first adjustment of said interposed elements and the related storage devices to a first value condition representative of a given value standing in the register, means for effecting a subsequent displacement of the said interposed elements in an opposite direction, means settable for preventing an operation of the storage elements during the latter said operation of the interposed elements and wherein the said couplings are thereby differentially displaced relative to the adjusted positions of the related storage devices for a selective value engagement therewith.

9. In a calculating machine having a plurality of registers each comprising an ordinal series of differentially operable digital registering devices, totalizing means therefor, actuators for said registers each differentially displaceable in accordance with values standing in selected ones of the said registers; the combination therewith of a fixed shaft, a first ordinal series of elements pivoted thereon and each in yieldable engagement with a related order of said actuators for differential displacement therewith, a second ordinal series of differentially adjustable elements pivoted upon said shaft and wherein each of said elements has yieldable engagement with the related order of said first ordinal series of elements for a corresponding value displacement therewith, means for locking the said second ordinal series of elements in selective value positions, means for restoring the actuators to starting condition, resilient means for restoring therewith any displaced ones of said first ordinal series of elements, a unidirectional drive coupling means between each of said first ordinal series of elements and the corresponding orders of said second ordinal series of elements, and wherein the restoral of any said first ordinal series of elements provides for relative displacement of the related unidirectional drive means with respect to effecting a coupling thereby of the first said ordinal series of elements with the corresponding orders of said second ordinal series of elements at differentially selective positions.

10. In a calculating machine having a register comprising an ordinal series of differentially operable digital registering devices and differentially movable actuators therefor; the combination therewith of means for taking a true negative total from said register including a stationary support shaft, an ordinal series of differentially adjustable interponent members pivoted thereon and each in yieldable engagement with a related order of said actuators, an ordinal series of differentially adjustable value storage members each pivoted upon said shaft adjacent corresponding orders of said first series members, differentially spaced notches on said storage members, resilient means for maintaining said storage members in yieldable engagement with their related order interponents whereby said notches are conditioned in given relationship therewith, a normally inffective coupling member pivoted upon each of said interposed members and adapted for a selective engagement with selected notches of the related order storage segments, means for effecting a corresponding value adjustment of said storage devices with any first adjustment of the interponents to a first value condition representative of a complemental negative value standing in the register, means for locking said storage members in any said adjusted position during return operation of the said interponents to their initial position, and wherein said return operation of the said interponents causes thereby a corresponding displacement of the related coupling members to effect thereby a selective value engagement thereof with the differentially spaced notches, and wherein a subsequent adjustment of the said interponents is now limited by the said storage segments to control adjustment of the actuators to a second value condition which differs from said first value condition by a digital amount equal to the complement of said complemental value.

11. The invention set forth in claim 10 and including an ordinal series of zero stops for the storage members, said stops arranged in successive overlapping manner for holding the higher order stops inactive by an inactive lower order stop, a normally active ordinal series of nines stops each displaceable with a related zero stop of the adjacent lower order, means operable following the said first value adjustment of the storage members for releasing said zero stops and also said nines stops wherein to permit displacement thereof to an active and to an inactive condition respectively, and wherein during said displacement said zero stops will sense for a first lower order storage member displaced to any significant digit value position and so limit all the higher order nines stops to a partial step movement, and wherein the lower order zero stops will move to zero control position and will displace therewith the significant order nine stop and any to the right thereof to inactive condition, and means cooperable with the partially displaced nines stops for restoring the said stops at the left of the lower order displaced storage member to active control condition and wherein a subsequent displacement of the actuators is thereby limited by cooperation of the storage members with said stops to a nines complement of the amount stored within the said storage members.

12. The invention set forth in claim 11 and including a fixed stop member universal to all the said storage segments and adapted for limiting an operation of any selected one of said storage members to a value of 10 whereby to effect in a first significant digit value order an automatic fugitive ones registration during the said subsequent operation of the storage members.

References Cited in the file of this patent
UNITED STATES PATENTS

| | | |
|---|---|---|
| 1,195,567 | Draughon | Aug. 25, 1916 |
| 1,957,501 | Horton | May 8, 1934 |
| 2,302,422 | Crouse | Nov. 17, 1942 |